US007363653B2

(12) United States Patent
Deng et al.

(10) Patent No.: US 7,363,653 B2
(45) Date of Patent: *Apr. 22, 2008

(54) FIREWALL INCLUDING LOCAL BUS

(75) Inventors: Feng Deng, San Jose, CA (US); Yan Ke, San Jose, CA (US); Dongping Luo, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 821 days.

This patent is subject to a terminal disclaimer.

(21) Appl. No.: 10/765,677

(22) Filed: Jan. 26, 2004

(65) Prior Publication Data

US 2004/0158744 A1 Aug. 12, 2004

Related U.S. Application Data

(63) Continuation of application No. 09/283,730, filed on Apr. 1, 1999, now Pat. No. 6,701,432.

(51) Int. Cl.
*G06F 9/00* (2006.01)

(52) U.S. Cl. .................... 726/11; 726/12; 726/1

(58) Field of Classification Search ............... 711/100; 726/11, 12, 1
See application file for complete search history.

(56) References Cited

U.S. PATENT DOCUMENTS

| 4,720,780 A | 1/1988 | Dolacek |
| 5,379,394 A * | 1/1995 | Goto ..................... 710/305 |
| 5,857,083 A | 1/1999 | Venkat |
| 5,884,025 A | 3/1999 | Baehr et al. |
| 5,964,895 A | 10/1999 | Kim et al. |
| 6,044,207 A | 3/2000 | Pecone et al. |
| 6,067,595 A | 5/2000 | Lindenstruth |
| 6,101,255 A | 8/2000 | Harrison et al. |
| 6,128,661 A | 10/2000 | Flanagin et al. |
| 6,154,839 A | 11/2000 | Arrow et al. |
| 6,223,237 B1 * | 4/2001 | McDermid ............... 710/307 |
| 6,226,723 B1 * | 5/2001 | Gustavson et al. ......... 711/170 |
| 6,240,513 B1 | 5/2001 | Friedman et al. |
| 6,247,101 B1 | 6/2001 | Settles |
| 6,434,600 B2 | 8/2002 | Waite et al. |
| 6,470,378 B1 | 10/2002 | Tracton et al. |
| 6,546,430 B2 | 4/2003 | Gray, III et al. |
| 6,701,432 B1 | 3/2004 | Deng et al. ............... 713/153 |

FOREIGN PATENT DOCUMENTS

WO    WO 98/36539    8/1998

* cited by examiner

*Primary Examiner*—Kambiz Zand
*Assistant Examiner*—Peter Poltorak
(74) *Attorney, Agent, or Firm*—Harrity Snyder LLP

(57) ABSTRACT

A gateway for screening packets transferred over a network. The gateway includes a plurality of network interfaces, a memory and a memory controller. Each network interface receives and forwards messages from a network through the gateway. The memory temporarily stores packets received from a network. The memory controller couples each of the network interfaces and is configured to coordinate the transfer of received packets to and from the memory using a memory bus. The gateway includes a firewall engine coupled to the memory bus. The firewall engine is operable to retrieve packets from the memory and screen each packet prior to forwarding a given packet through the gateway and out an appropriate network interface. A local bus is coupled between the firewall engine and the memory providing a second path for retrieving packets from memory when the memory bus is busy.

20 Claims, 10 Drawing Sheets

|  | 1st Clock | 2nd Clock | 3rd Clock | 4th Clock | 5th Clock | 6th Clock | 7th Clock |
|---|---|---|---|---|---|---|---|
| 1st Rule | Fetch Rule | IP Comparison | Port Comparison | | | | |
| 2nd Rule | | Fetch Rule | IP Comparison | Port Comparison | | | |
| 3rd Rule | | | Fetch Rule | IP Comparison | Port Comparison | | |
| 4th Rule | | | | Fetch Rule | IP Comparison | Port Comparison | |
| 5th Rule | | | | | Fetch Rule | IP Comparison | Port Comparison |

Fig. 6b

FIREWALL INCLUDING LOCAL BUS

This application is a continuation (and claims the benefit of priority under 35 USC 120) of U.S. application Ser. No. 09/283,730, filed Apr. 1, 1999, now U.S. Pat. No. 6,701,432 which is incorporated by reference herein.

BACKGROUND OF THE INVENTION

The present invention relates generally to data routing systems, and more particularly to a method and apparatus for providing secure communications on a network.

A packet switch communication system includes a network of one or more routers connecting a plurality of users. A packet is the fundamental unit of transfer in the packet switch communication system. A user can be an individual user terminal or another network. A router is a switching device which receives packets containing data or control information on one port, and based on destination information contained within the packet, routes the packet out another port to the destination (or intermediary destination). Conventional routers perform this switching function by evaluating header information contained within the packet in order to determine the proper output port for a particular packet.

The network can be an intranet, that is, a network connecting one or more private servers such as a local area network (LAN). Alternatively, the network can be a public network, such as the Internet, in which data packets are passed over untrusted communication links. The network configuration can include a combination of public and private networks. For example, two or more LAN's can be coupled together with individual terminals using a public network such as the Internet. When public and private networks are linked, data security issues arise. More specifically, conventional packet switched communication systems that include links between public and private networks typically include security measures for assuring data integrity.

In order to assure individual packet security, packet switched communication systems can include encryption/decryption services. Prior to leaving a trusted portion of a network, individual packets can be encrypted to minimize the possibility of data loss while the packet is transferred over the untrusted portion of the network (the public network). Upon receipt at a destination or another trusted portion of the communication system, the packet can be decrypted and subsequently delivered to a destination. The use of encryption and decryption allows for the creation of a virtual private network (VPN) between users separated by untrusted communication links.

In addition to security concerns for the data transferred over the public portion of the communications system, the private portions of the network must safeguard against intrusions through the gateway provided at the interface of the private and the public networks. A firewall is a device that can be coupled in-line between a public network and private network for screening packets received from the public network. Referring now to FIG. 1a, a conventional packet switch communication system 100 can include two private networks 102 coupled by a public network 104 for facilitating the communication between a plurality of user terminals 106. Each private network can include one or more servers and a plurality of individual terminals. Each private network 102 can be an intranet such as a LAN. Public network 104 can be the Internet, or other public network having untrusted links for linking packets between private networks 102a and 102b. At each gateway between a private network 102 and public network 104 is a firewall 110. The architecture for a conventional firewall is shown in FIG. 1b.

Firewall 110 includes a public network link 120, private network link 122 and memory controller 124 coupled by a bus (e.g., PCI bus) 125. Memory controller 124 is coupled to a memory (RAM) 126 and firewall engine 128 by a memory bus 129. Firewall engine 128 performs packet screening prior to routing packets through to private network 102. A central processor (CPU) 134 is coupled to memory controller 124 by a CPU bus 132. CPU 134 oversees the memory transfer operations on all buses shown. Memory controller 124 is a bridge connecting CPU Bus 132, memorybus 129 and PCI bus 125.

Packets are received at public network link 120. Each packet is transferred on bus 125 to, and routed through, memory controller 124 and on to RAM 126 via memory bus 129. When firewall engine 128 is available, packets are fetched using memory bus 129 and processed by the firewall engine 128. After processing by the firewall engine 128, the packet is returned to RAM 126 using memory bus 129. Finally, the packet is retrieved by the memory controller 124 using memory bus 129, and routed to private network link 122.

Unfortunately this type of firewall is inefficient in a number of ways. A majority of the traffic in the firewall utilizes memory bus 129. However, at any time, memory bus 129 can allow only one transaction. Thus, memory bus 129 becomes a bottleneck for the whole system and limits system performance.

The encryption and decryption services as well as authentication services performed by firewall engine 128 typically are performed in series. That is, a packet is typically required to be decrypted prior to authentication. Serial processes typically slow performance.

A conventional software firewall can sift through packets when connected through a T-1 or fractional T-1 link. But at T-3, Ethernet, or fast Ethernet speeds software-based firewalls running on an average desktop PC can get bogged down.

SUMMARY OF THE INVENTION

In general, in one aspect, the invention provides a gateway for screening packets transferred over a network. The gateway includes a plurality of network interfaces, a memory and a memory controller. Each network interface receives and forwards messages from a network through the gateway. The memory temporarily stores packets received from a network. The memory controller couples each of the network interfaces and is configured to coordinate the transfer of received packets to and from the memory using a memory bus. The gateway includes a firewall engine coupled to the memory bus. The firewall engine is operable to retrieve packets from the memory and screen each packet prior to forwarding a given packet through the gateway and out an appropriate network interface. A local bus is coupled between the firewall engine and the memory providing a second path for retrieving packets from memory when the memory bus is busy. An expandable external rule memory is coupled to the local bus and includes one or more rule sets accessible by the firewall engine using the local bus. The firewall engine is operable to retrieve rules from a rule set and screen packets in accordance with the retrieved rules.

Aspects of the invention can include one or more of the following features. The firewall engine can be implemented in a hardware ASIC. The ASIC includes an authentication engine operable to authenticate a retrieved packet contemporaneously with the screening of the retrieved packet by the firewall engine. The gateway includes a decryption/encryption engine for decrypting and encrypting retrieved packets.

The ASIC can include an internal rule memory for storing one or more rule sets used by the firewall engine for screening packets. The internal rule memory includes oft accessed rule sets while the external rule memory is configured to store lesser accessed rule sets. The internal rule memory includes a first portion of a rule set, and a second portion of the rule set is stored in the external rule memory. The memory can be a dual-port memory configured to support simultaneous access from each of the memory bus and the local bus.

The gateway can include a direct memory access controller configured for controlling memory accesses by the firewall engine to the memory when using the local bus.

In another aspect, the invention provides a rule set for use in a gateway. The gateway is operable to screen packets transferred over a network and includes a plurality of network interfaces, a memory, a memory controller and a firewall engine. Each network interface receives and forwards messages from a network through the gateway. The memory is configured to temporarily store packets received from a network. The memory controller is coupled to each of the network interfaces and configured to coordinate the transfer of received packets to and from the memory using a memory bus. The firewall engine is coupled to the memory bus and operable to retrieve packets from the memory and screen each packet prior to forwarding a given packet through the gateway and out an appropriate network interface. The rule set includes a first and second portion of rules. The first portion of rules are stored in an internal rule memory directly accessible by the firewall engine. The second portion of rules are an expandable and stored in an external memory coupled by a bus to the firewall engine and are accessible by the firewall engine to screen packets in accordance with the retrieved rules.

Aspects of the invention can include one or more of the following features. The rule set can include a counter rule. The counter rule includes a matching criteria, a count, a count threshold and an action. The count is incremented after each detected occurrence of a match between a packet and the matching criteria associated with the counter rule. When the count exceeds the count threshold the action is invoked.

The first portion of rules can include a pointer to a location in the second portion of rules. The pointer can be in the form of a rule that includes both a pointer code and also an address in the external memory designating a next rule to evaluate when screening a current packet. The next rule to evaluate is included in the second portion of rules.

In another aspect, the invention provides a gateway for screening packets received from a network and includes a plurality of network interfaces each for transmitting and receiving packets to and from a network. The gateway includes an integrated packet processor including a separate firewall engine, authentication engine, and a direct memory access controller; a dual-port memory for storing packets. A memory bus is provided for coupling the network interfaces, the packet processor and the dual-port memory. A local bus couples the packet processor and the dual-port memory. The packet processor invokes the direct memory access controller to retrieve a packet directly from the dual-port memory using the local bus. A memory controller is included for controlling the transfer of packets from the network interfaces to the dual-port memory. A processing unit extracts information from a packet and provides the information to the packet processor for processing.

Aspects of the invention can include one or more of the following features. The integrated packet processor can include a separate encryption/decryption engine for encrypting and decrypting packets received by the gateway.

The invention can include one or more of the following advantages. A local bus is provided for local access to memory from the firewall ASIC. The solution is implemented in hardware, easily handling dense traffic that would have choked a conventional firewall. A combination firewall and VPN (virtual private network) solution is provided that includes a separate stand-alone firewall engine, encryption/decryption engine and authentication engine. Each engine operates independently and exchanges data with the others. One engine can start processing data without waiting for other engines to finish all their processes. Parallel processing and pipelining are provided and deeply implemented into each engine and each module further enhancing the whole hardware solution. The high processing speed of hardware increases the throughput rate by a factor of ten. Other advantages and features will be apparent from the following description and claims.

BRIEF DESCRIPTION OF THE DRAWING

FIG. 6b is an illustration of a pipeline for use in rule searching.

DESCRIPTION OF THE PREFERRED EMBODIMENTS

Figure 1A:
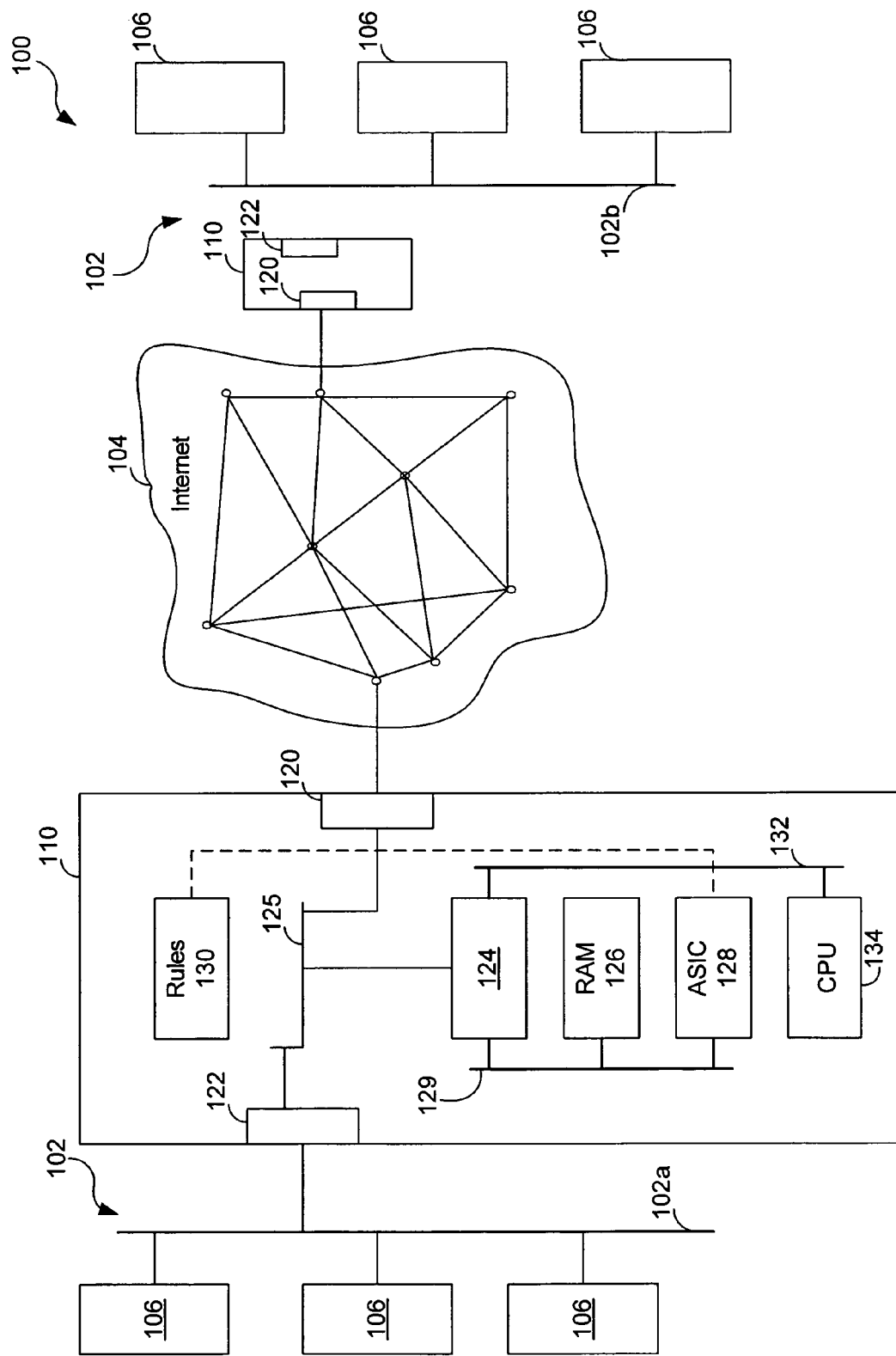
FIG. 1a is a block diagram of a conventional packet switch communication system.
Figure 1B:
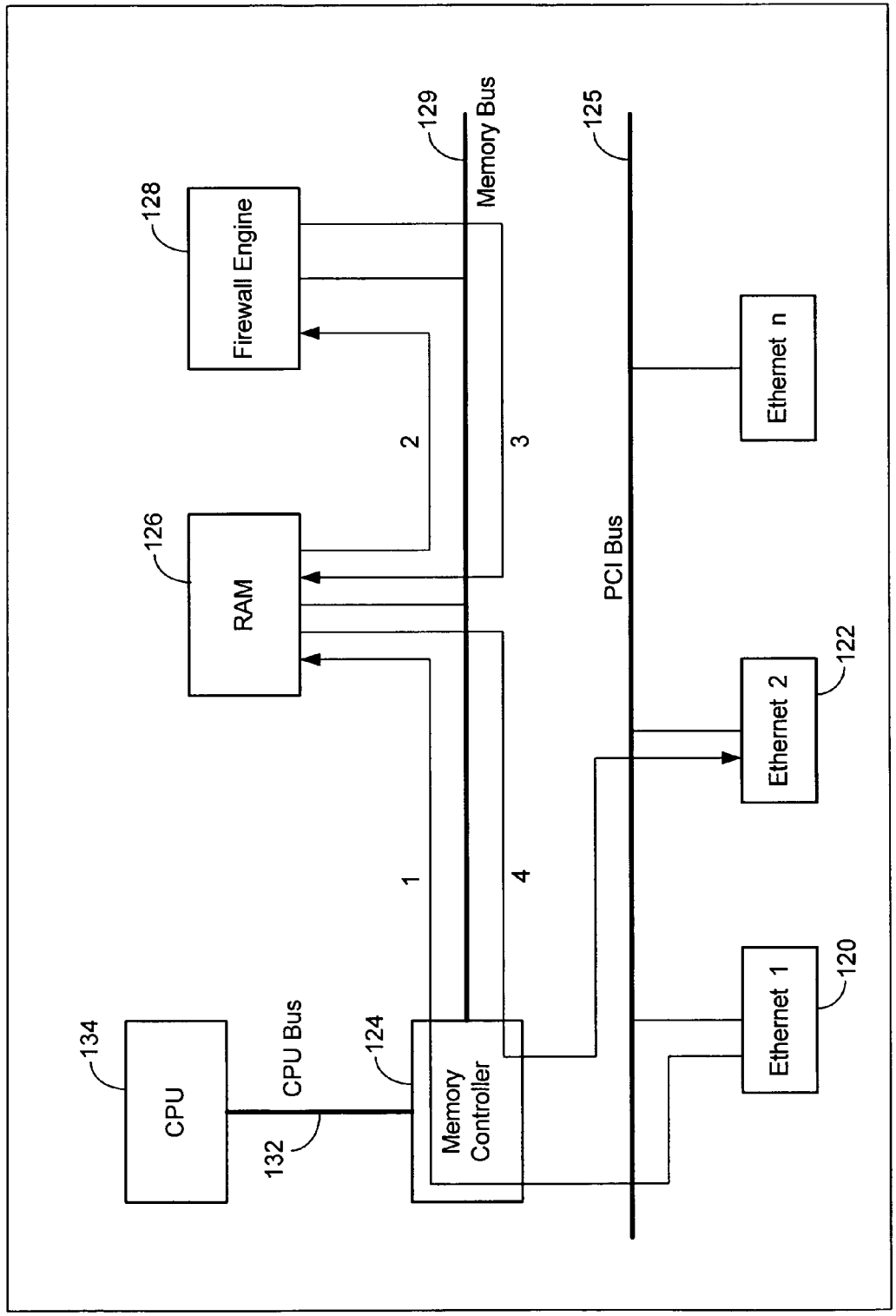
FIG. 1b is a block diagram of conventional firewall device.
Figure 2:
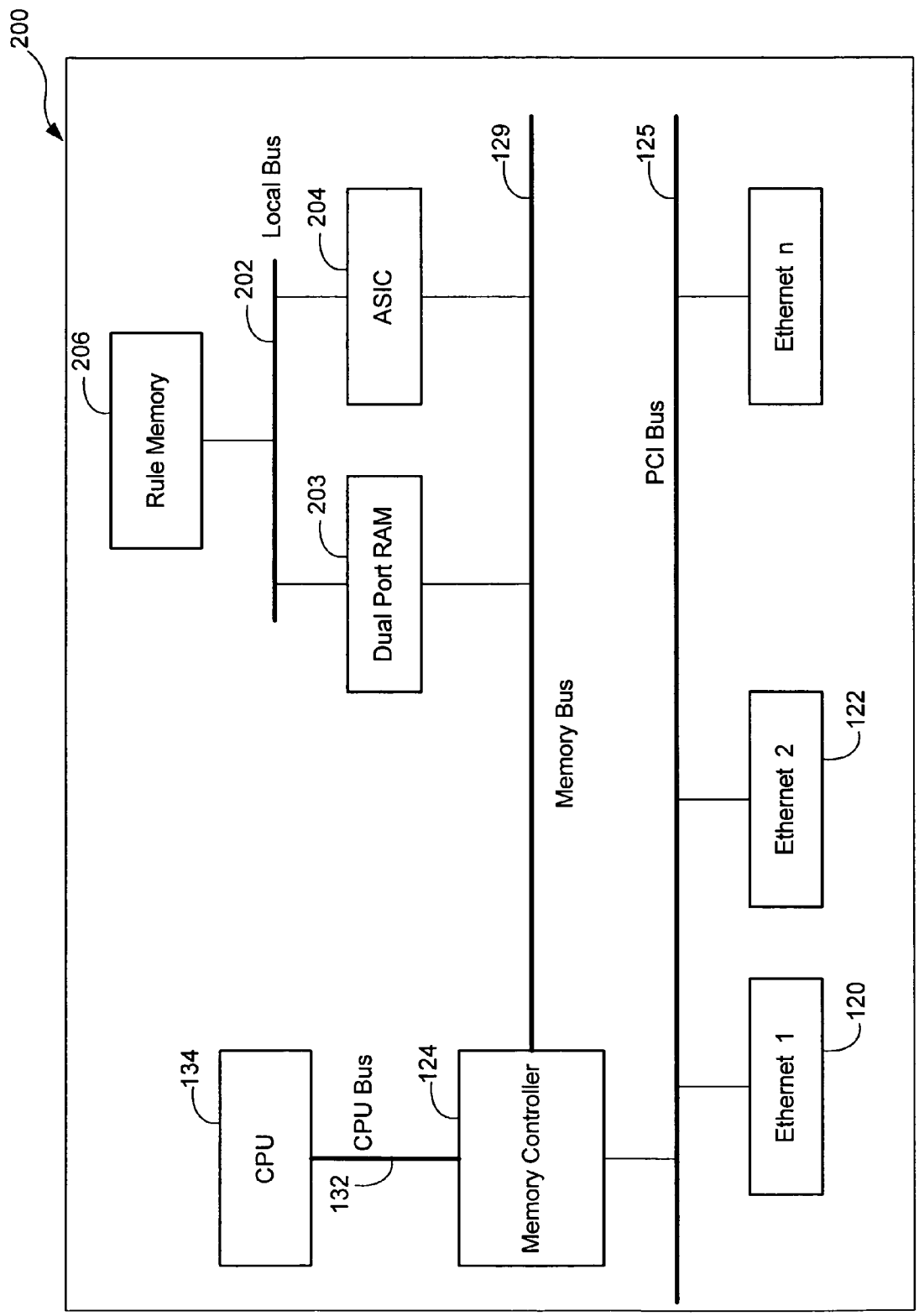
FIG. 2 is a schematic block diagram of communication system including local bus and ASIC in accordance with the invention.

Referring to FIG. 2, a communication system 200 includes a public network link 120, private network link 122 and memory controller 124 coupled by a bus 125. Communication system 200 can be a gateway between two distinct networks, or distinct portions of a network. The gateway can bridge between trusted and untrusted portions of a network or provide a bridge between a public and private network. Each network link 120 and 122 can be an Ethernet link that includes an Ethernet media access controller (MAC) and Ethernet physical layer (PHI) for allowing the communication system to receive/send packets from/to networks. A memory bus 129 couples a memory controller 124 to a dual-port memory 203 and an application specific integrated circuit (ASIC) 204. Local bus 202 also links ASIC 204 to dual-port memory 203. Dual-port memory 203 can be a random access memory (RAM) with two separate ports. Any memory location can be accessed from the two ports in the same time.

Associated with ASIC 204 is an off-chip rule memory 206 for storing a portion of the software rules for screening packets. Local bus 202 couples rule memory 206 to ASIC 204. Off-chip rule memory 206 can be a static RAM and is used to store policy data. The structure and contents of the off-chip-memory is discussed in greater detail below.

A central processor (CPU) 134 is coupled to memory controller 124 by CPU bus 132. CPU 134 oversees the memory transfer operations on memory bus 129 and bus 125.

Figure 3:
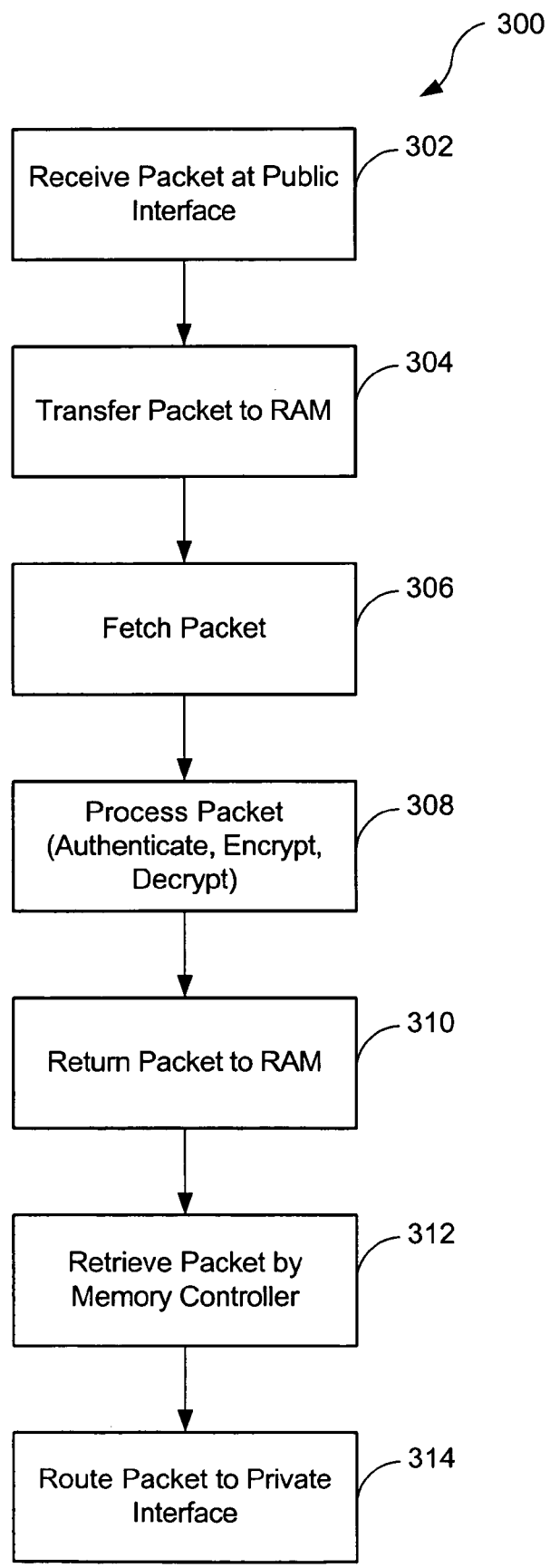
FIG. 3 is a flow diagram for the flow of packets through the communication system of FIG. 2.

Referring now to FIGS. 2 and 3, a process 300 for screening packets is described in general. Packets are received at public network link 120 (302). Each packet is transferred on bus 125 to, and routed through, memory controller 124 and on to dual-port memory (RAM) 203 via memory bus 129 (304). When ASIC 204 is available, the packet is fetched by ASIC 204 using local bus 202 (306). After processing by ASIC 204 (308), the packet is returned to RAM 203 using local bus 202 (310). The processing by ASIC 204 can include authentication, encryption, decryption, virtual private network (VPN) and firewall services. Finally, the packet is retrieved by memory controller 124 using memory bus 129 (312), and routed to private network link 122 (314).

Figure 4:
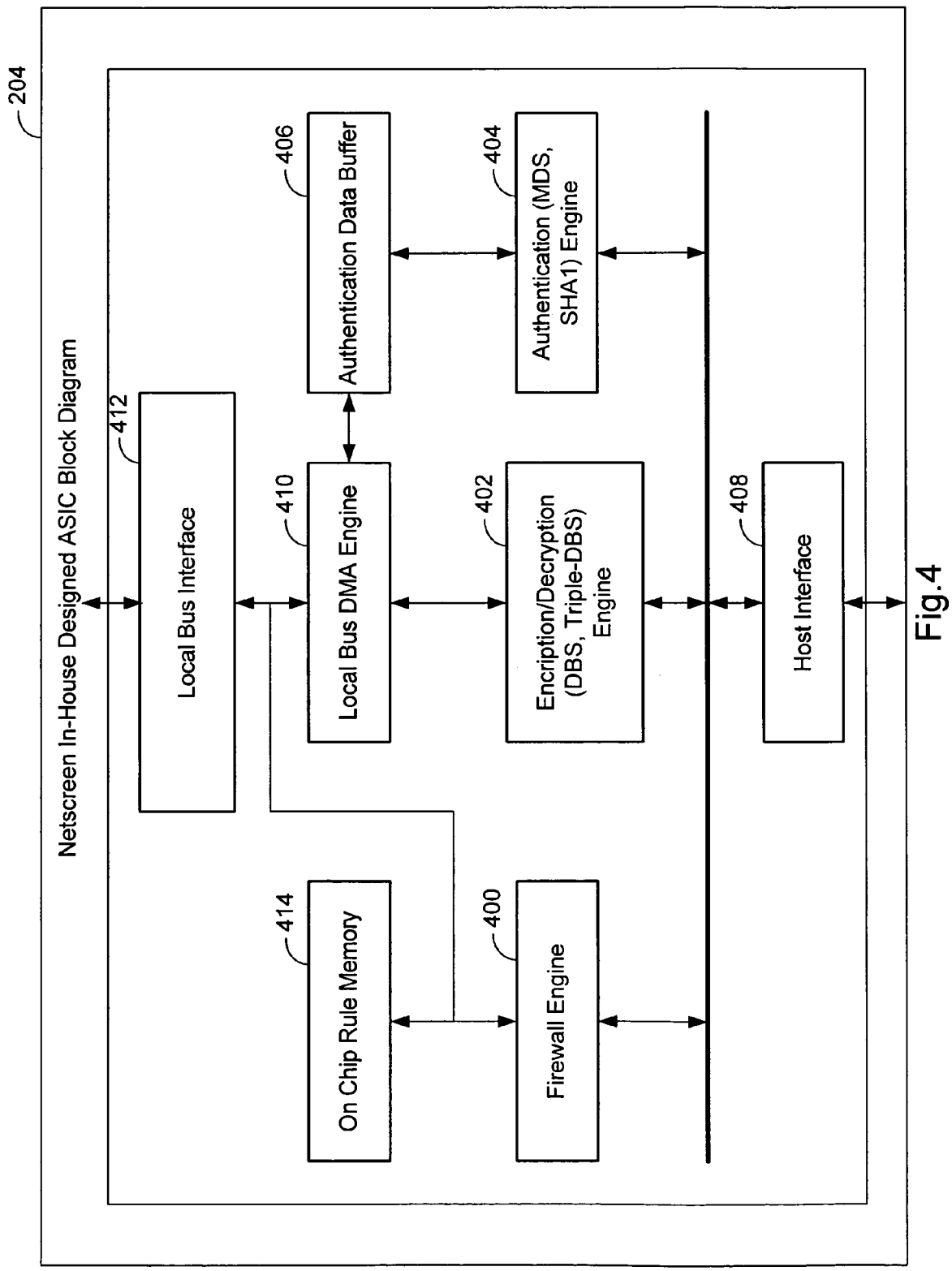
FIG. 4 is a schematic block diagram of the ASIC of FIG. 2.

Referring now to FIG. 4, the heart of the communications system is ASIC 204. ASIC 204 integrates a firewall engine, VPN engine and local bus direct memory access (DMA) engine in a single chip. ASIC 204 includes a firewall engine 400, an encryption/decryption engine 402, an authentication engine 404, an authentication data buffer 406, a host interface 408, a local bus DMA engine 410, a local bus interface 412 and on-chip rule memory 414.

Host interface 408 provides a link between ASIC 204 and memory bus 129. Packets are received on host interface 408 and processed by ASIC 204.

Firewall engine 400 enforces an access control policy between two networks. Firewall engine utilizes rules stored in on-chip rule memory 414 and off-chip rule memory 206.

A VPN module is provided that includes encryption/decryption engine 402 and authentication engine 404.

Encryption/decryption engine 402 performs encryption or decryption with one or more encryption/decryption algorithms. In one implementation, a data encryption standard (DES) or Triple-DES algorithm can be applied to transmitted data. Encryption assures confidentiality of data, protecting the data from passive attacks, such as interception, release of message contents and traffic analysis.

Authentication engine 404 assures that a communication (packet) is authentic. In one implementation MD5 and SHA1 algorithms are invoked to verify authentication of packets. Authentication buffer 406 is a temporary buffer for storing partial results generated by authentication engine 404. The localized storage of partial results allows the authentication process to proceed without requiring the availability of the local bus or memory bus. The partial results can be temporarily stored in authentication buffer 406 until the appropriate bus is free for transfers back to dual-port memory 203.

Local bus DMA engine 410 facilitates access to dual-port memory 203 using local bus 202. As such, CPU 132 is freed to perform other tasks including the transfer of other packets into dual-port memory 203 using memory bus 129.

There are two rule memories in the communication system, on-chip rule memory 414 inside ASIC 204, and off-chip rule memory 206, that is external to ASIC 204. From a functionality point of view, there is no difference between these two memories. The external memory enlarges the whole rule memory space. Rule searching can be implemented in a linear order with the internal rule memory first. Of course, the searching process is faster when performed in the on-chip rule memory. The structure for the rules is described in greater detail below.

Figure 5:
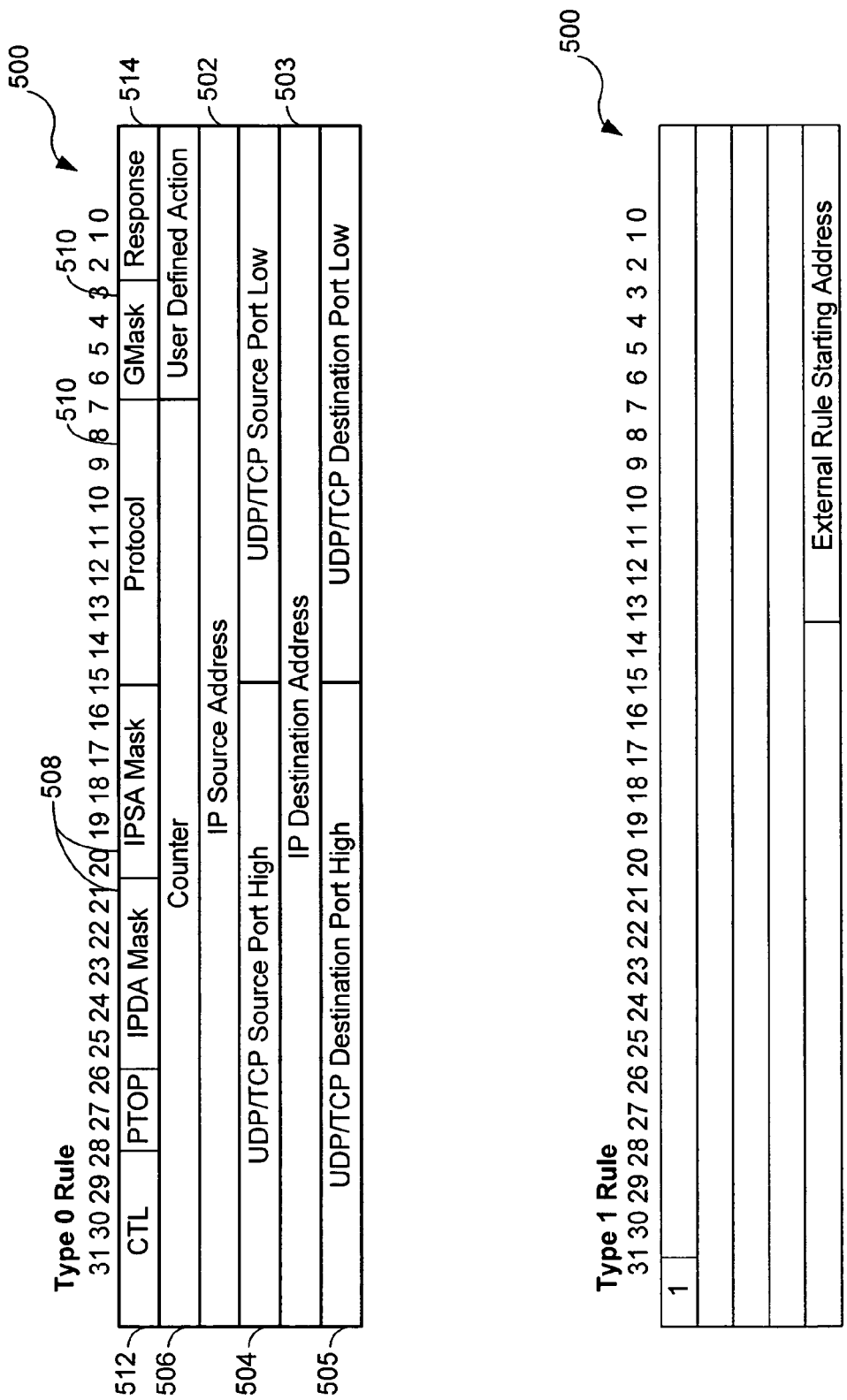
FIG. 5 illustrates a rule structure for use by the firewall engine.

A rule is a control policy for filtering incoming and outgoing packets. Rules specify actions to be applied as against a certain packet. When a packet is received for inspection (rule search), the packet's IP header (six 32-bit words), TCP header (six 32-bit words) or UDP header (two 32-bit words) may require inspecting. A compact and efficient rule structure is provided to handle all the needs of firewall engine 400. In one implementation, a minimal set of information is stored in a rule including the source/destination IP addresses, UDP/TCP source/destination addresses and transport layer protocol. This makes the rule set compact, however sufficient for screening services. The structure 500 of a rule is shown in FIG. 5. Rules can include a source/destination IP address 502, 503, a UDP/TCP source/destination port 504, 505, counter 506, source/destination IP address mask 508, transport layer protocol 510, general mask (GMASK) 511, searching control field 512 and a response action field 514. In one embodiment, each rule includes six 32-bit words. Reserved bits are set to have a logical zero value.

Searching control field 512 is used to control where to continue a search and when to search in the off-chip rule memory 206. In one implementation, searching control field 512 is four bits in length including bits B31-B28.

The rule set can contain two types of rules. In one implementation, the two rule types are distinguished by bit B31 of the first word in a rule. A logical zero value indicates a type "0" rule, referred to as a normal rule. A logical one value indicates a type "1" rule. Type-1 rules are an address pointing to a starting location in the external rule memory at which point searching is to continue for a given packet. On-chip memory 414 includes spaces for many rules for handling the packet traffic in to and out from different interfaces (such as, from a trusted interface (private network interface 120) to an untrusted interface (public network interface 122)). If a rule set is too large to be contained in on-chip rule memory 414, a portion of the rule set can be placed in the on-chip memory 414 and the remainder placed in off-chip rule memory 206. When a rule set is divided and includes rules in both on and off-chip memories, the final rule contained in the on-chip memory 414 for the rule set is a type-1 rule. Note that this final rule is not to be confused with the last rule of a rule set described below. The final rule merely is a pointer to a next location at which searching is to continue.

When firewall engine 400 reaches a rule that is identified as a type-1 rule (bit B31 is set to a logical one value), searching for the rule set continues in off-chip memory. The engine uses the address provided in bits B0-B13 of the sixth word of the type-1 rule and continues searching in off-chip rule memory 206 at the address indicated. Bit B30 is a last rule indicator. If bit B30 is set to a logical one value, then the rule is the last rule in a rule set. Rule match processes end after attempting to match this rule. Bit B29 is a rule set indicator. When bit B29 is set to a logical one value, the rule match process will not stop when the packet matches the rule. When bit B29 is set to a logical zero value, the rule match process stops when the packet matches the rule. Note that this bit applies only when bit B2 is set. When bit B2 is set to a logical zero value, regardless of the value of this bit B29, the rule match process always stops when a match is found. The value and use of bit B2 is discussed in greater detail below. In the implementation described, bit B28 is reserved.

The source/destination IP address 502, 503 defines a source and a destination address that is used as a matching criterion. To match a rule, a packet must have come from the defined source IP address and its destination must be the defined destination IP address.

The UDP/TCP source/destination port 504, 505 specifies what client or server process the packet originates from on the source machine. Firewall engine 400 can be configured to permit or deny a packet based on these port numbers. In one implementation, the rule does not include the actual TCP/UDP port, but rather a range for the port. A port opcode (PTOP) can be included for further distinguishing if a match condition requires the actual TCP/UDP port falls inside or outside the range. This is very powerful and allows for a group of ports to match a single rule. In one implementation, the range is defined using a high and low port value. In one implementation, bit B26 is used to designate a source port opcode match criterion. When the B26 bit is set to a logical zero, the packet source port must be greater than or equal to the source port low and less than or equal to the source port high in order to achieve a match. When the B26 bit is set to a logical one value, the packet source port must be less than the source port low or greater than the source port high. Similarly, the B27 bit is used to designate a destination port opcode match criterion. When bit B27 is set to a logical zero value, the packet destination port must be greater than or equal to the destination port low and less than or equal to the destination port high in order to achieve a match. Again, a one value indicates that the packet destination port should be less than the destination port low value or greater than the destination port high value to achieve a match for the rule.

Counter 506 is a high performance hardware counter. Counter 506 records a number of times that a particular rule has matched and is updated after each match is determined. In one implementation, at a defined counter threshold, counter 506 can trigger firewall engine 400 to take certain actions. In one implementation, the defined threshold for the counter is predefined. When the counter reaches the threshold value, a register bit is set. Software can monitor the register and trigger certain actions, such as deny, log and alarm. When a rule is created, an initial value can be written into the counter field. The difference between the initial value and the hardware predefined threshold determines the actual threshold. Generally speaking, the hardware ASIC provides a counting mechanism to allow for the software exercise of actions responsive to the count.

Source/destination IP address mask 508 allows for the masking of less significant bits of an IP address during IP address checking. This allows a destination to receive packets from a group of sources or allow a source to broadcast packets to a group of destinations. In one implementation, two masks are provided: an Internet protocol source address (IPSA) mask and an Internet protocol destination address (IPDA) mask.

The IPSA mask can be five bits in length and be encoded as follows: 00000, no bits are masked (all 32-bits are to be compared); 00001, bit "0" of the source IP address is masked (bit "0" is a DON't CARE when matching the rule); 00010, bit 1 and bit 0 are masked; 01010, the least 10 bits are masked; and 11111, only bit 31 (the MSB) is not masked. The IPDA mask is configured similar to the IPSA mask and has the same coding, except that the mask applies to the destination IP address.

Transport layer protocol 510 specifies which protocol above the IP layer (TCP, UDP, etc.) the policy rule is to be enforced against. In one implementation, transport layer protocol field 510 is an 8-bit field. For a rule match to arise, the transport layer protocol field 510 must match the packet IP header protocol field. However, if the B6 bit is set to a logical one, the transport layer protocol field is disregarded (a DON'T CARE as described above). GMASK field 512 indicates to firewall engine 400 whether to ignore or check the packet's source IP address, destination IP address, protocol or packet acknowledgment or reset bits. Other masks can also be included. In one implementation, the GMASK includes four bits designated B4-B7. When the B4 bit is set to a logical one, the packet source IP address is disregarded when matching the rule (source IP address comparison result will not be considered when determining whether or not the packet matches the rule). When the B5 bit is set to a logical one, the packet destination IP address is disregarded when matching the rule (destination IP address comparison result will not be considered when determining whether or not the packet matches the rule). When the B6 bit is set to a logical one, the packet protocol field is disregarded when matching the rule (packet protocol field comparison result will not be considered when determining whether or not the packet matches the rule). Finally, when the B7 bit is set to a logical one, both the packet acknowledge (ACK) bit and reset bit are disregarded when matching the rule. When the B7 bit is set to a logical zero, the packet ACK bit and/or reset bit must be set (to a logical one value) for a match to arise.

Response action field 514 can be used to designate an action when a rule match is detected. Examples of actions include permit/deny, alarm and logging. In one implementation, response action field 514 is four bits in length including bits B0 to B3. In one implementation, the B0 bit is used to indicate a permit or deny action. A logical one indicates that the packet should be permitted if a match to this rule occurs. A logical zero indicates that the packet should be denied. The B1 bit is used as an alarm indication. A logical one indicates that an alarm should be sent if the packet matches the particular rule. If the bit is not set, then no alarm is provided. Alarms are used to indicate a possible security attack or an improper usage. Rules may be included with alarm settings to provide a measure of network security. When a match occurs, an alarm bit can be set in a status register (described below) to indicate to the CPU that the alarm condition has been satisfied. Depending on the number or kinds of alarms, the CPU can implement various control mechanisms to safeguard the communications network.

The B2 bit can be used to indicate a counter rule. A logical one indicates that the rule is a counter rule. For a counter rule, the least 24 bits of the second word of the rule are a counter (otherwise, the least 24 bits are reserved for a non-counter rule). The counter increments whenever a packet matches the rule. A counter rule can include two types: a counter-only rule and accumulate (ACL) rule with counter enabled. When matching a counter only rule, the count is incremented but searching continues at a next rule in the rule set. When matching a ACL rule with counter enabled, the counter is incremented and searching terminates at the rule.

The B3 bit is a log indication. A logical one indicates that the packet information should be logged if a match arises.

Figure 6A:
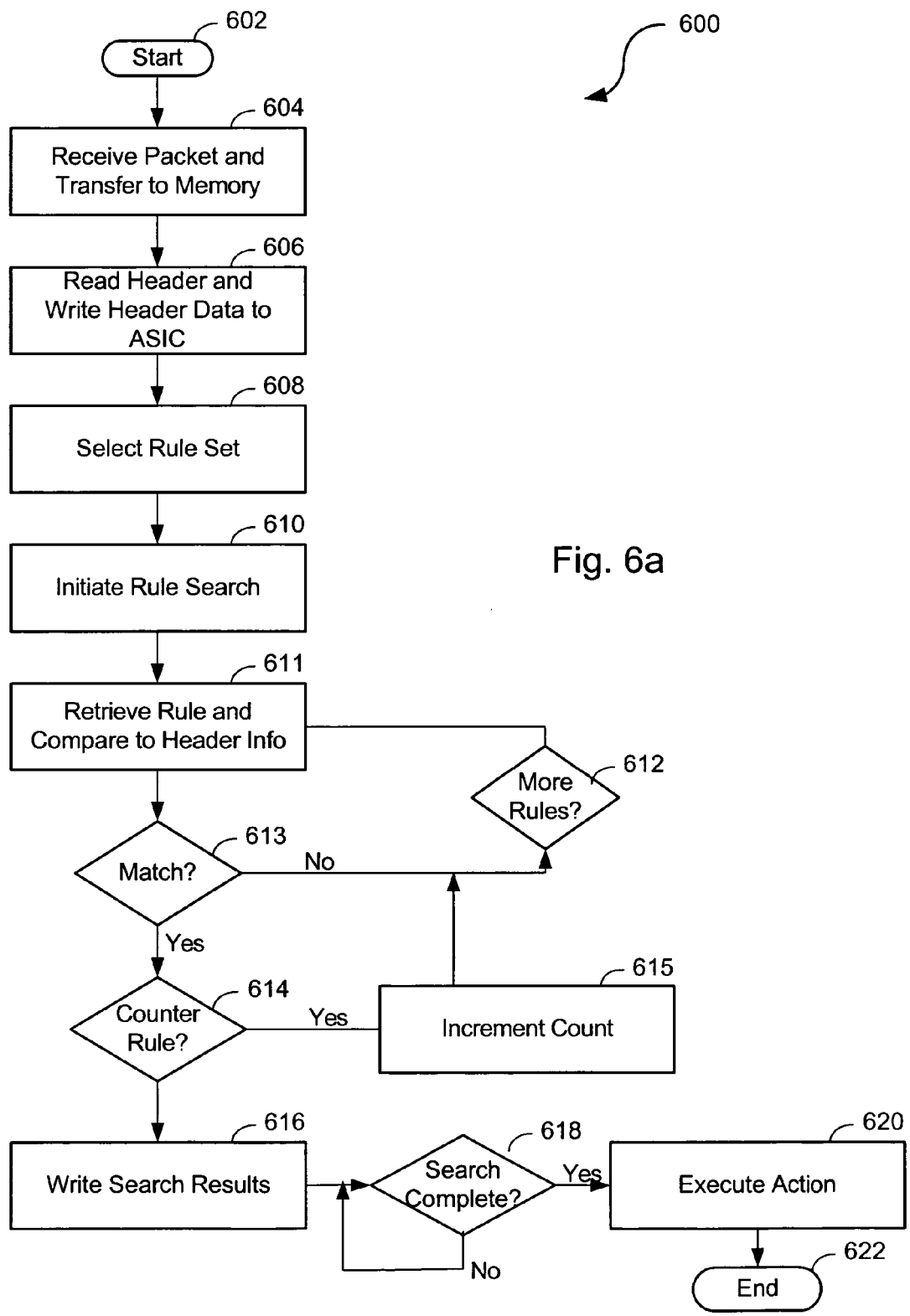
FIG. 6a is a flow diagram for a firewall screening process.

Referring now to FIGS. 2, 4 and 6a, a process 600 executed by firewall engine 400 is shown for screening packets using both the on-chip and off-chip rule memories. The firewall engine process begins at step 602. A packet is received at an interface (public network interface 122) and transferred to dual-ported memory 203 using a DMA process executed by memory controller 124 (604).

CPU 134 reads packet header information from packet memory, then writes the packet information into special registers on ASIC 204 (606). These registers are mapped onto the system memory space, so CPU 134 has direct access to them. In one implementation the registers include: a source IP register, for storing the packet source IP address; a destination IP register, for storing the packet destination IP address; a port register, for storing the TCP/UDP source and destination ports; a protocol register for storing the transport layer protocol; and an acknowledge (ACK) register for storing the ACK bit from the packet.

CPU 134 also specifies which rule set to search by writing to a rule set specifier register (608). In one implementation, a plurality of rule sets are stored in rule memory, each having a starting address. In one implementation, two rule sets are available and two registers are used to store the starting addresses of each rule set. Depending on the value written to the rule set specifier, the searching begins at the appointed rule set.

CPU 134 issues a command to firewall engine 400 by writing to a control register to initiate the ASIC rule search (610). Firewall engine 400 compares the contents of the special registers to each rule in sequence (611) until a match is found (612). The search stops when a match is found (613). If the match is to a counter rule (614), then the count is incremented (615) and the search continues (back at step 612). If the counter threshold is exceeded or if the search locates a match (non-counter match), the search results are written to a status register (616). In one implementation, the status register includes ten bits including: a search done bit indicating a search is finished; a match bit indicating a match has been found; a busy bit indicating (when set) that the firewall engine is performing a search; and error bit indicating an error occurred during the search; a permit/deny bit to signal the firewall to permit or deny the inspected packet; an alarm bit to signal the firewall if an alarm needs to be raised; a log bit to signal the firewall if the packet needs to be logged; a VPN bit to signal the system if the packet needs VPN processing; a counter rule address bit to store the matched counter rule address; and a counter full bit for indicating the counter has reached a threshold.

While firewall engine 400 is doing a search, CPU 134 polls the status register to check whether the engine is busy or has finished the search (618). When the CPU 134 determines the search is complete, CPU 134 executes certain actions against the current packet based on the information in the status register, such as permit or deny the packet, signal a alarm and log the packet (620).

The search may find no match and if so, the packet can be discarded. If the packet is permitted, other operations like encryption/decryption or authentication can be performed on the packet as required. When all of the required operations are completed, the packet can be transmitted through a network interface (private network interface 120). After the appropriate action has been invoked, the process ends (622).

To speed the rule search process, a pipelining methodology is included in ASIC 204. A pipeline is a common design methodology that is deeply implemented in the ASIC design. Basically, a lengthy process is chopped into many independent sub-processes in a sequence. A new process can be started without waiting for a previously invoked process to finish. In firewall engine 400, a rule search is completed in 3 clock cycles using a pipeline process. During the first clock cycle, rule information is fetched from rule memory. During the second clock cycle, an IP address comparison is performed. Finally, during the third clock cycle, a TCP/UDP port comparison is performed. Each of these 3 steps are independent sub-processes of a rule search. A pipeline is then applied to the rule search process. FIG. 6b illustrates the pipeline design. When a rule search starts, the first rule information is fetched in the 1st clock cycle. In the 2nd clock cycle, the IP address of the current packet is compared with the rule. At the same clock cycle, the 2nd rule information is fetched, that is the 2nd rule search starts. The process continues in this manner until the search is completed. A rule search is every clock cycle not including the 3-clock latency. If the pipeline was not used, the rule search could take three times longer.

Figure 7:
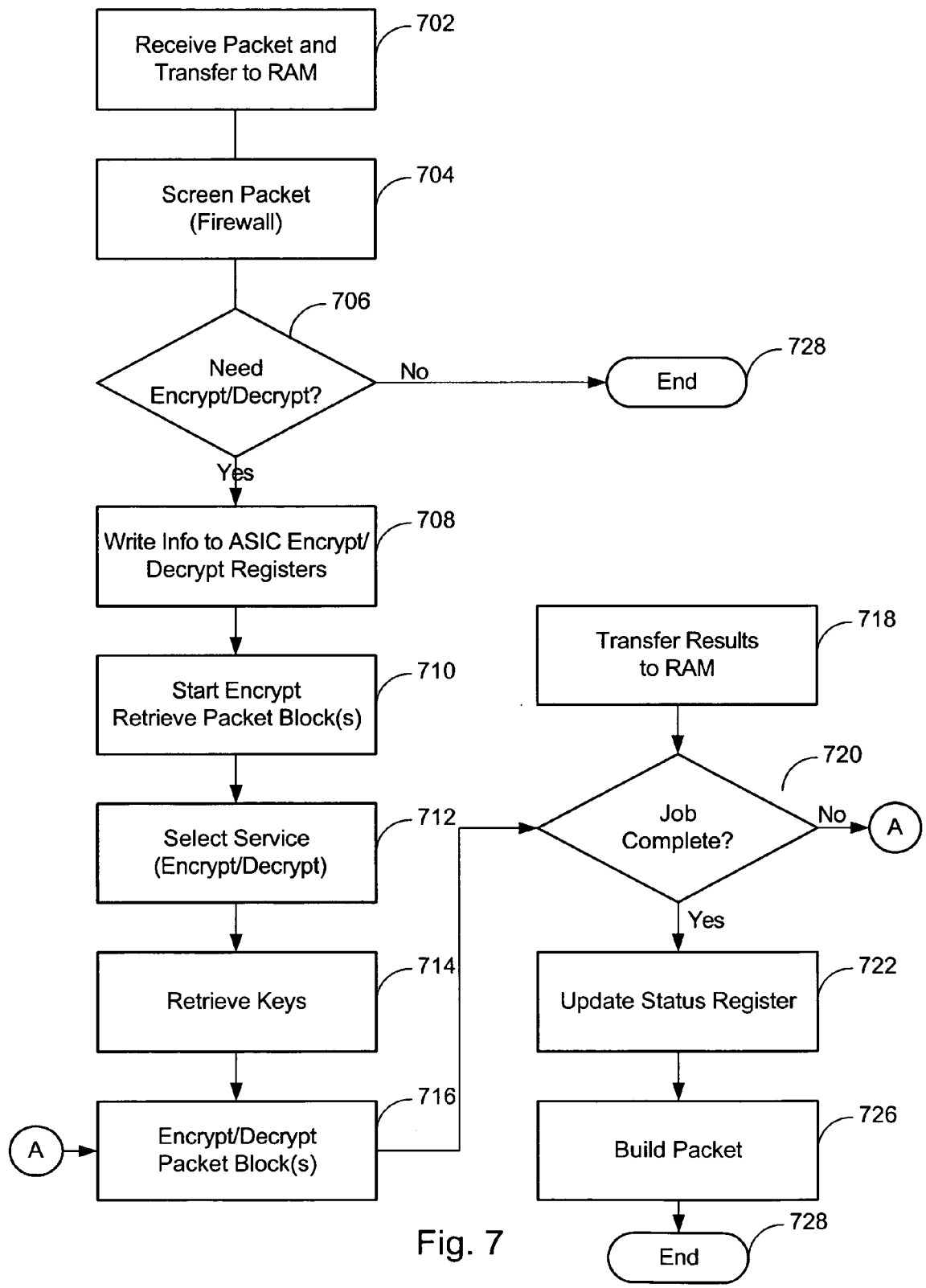
FIG. 7 is a flow diagram for an encryption process.

Referring now to FIGS. 2, 4 and 7, an encryption/decryption process 700 is shown. A packet is received at a network interface and DMA=d to packet memory (dual-port RAM 203) (702). If the packet is permitted after the firewall inspection (704) and encryption or decryption is needed (706), then the process continues at step 708.

In step 708, CPU 134 writes information needed by the encryption/decryption engine 402 into special registers on ASIC 204. In one implementation, the special registers include: one or more key registers, for storing the keys used by encryption/decryption engine 402; initial vector (IV) registers, for storing the initial vectors used by encryption/decryption engine 402; a DMA source address register, for storing the starting address in the dual-port memory where the packet resides; a DMA destination address register, for storing the starting address in the dual-port memory where CPU 134 can find the encryption/decryption results; and a DMA count register, for indicating how many words of the packet need to be encrypted or decrypted. CPU 134 issues a command to start the encryption or decryption operation (710). In one implementation, this is accomplished by writing to the DMA count register. Encryption/decryption engine 402 determines which operation to invoke (encryption or decryption) (712). Keys for the appropriate process are retrieved from the key registers (714). Encryption/decryption engine 402 uses the keys to encrypt/decrypt the packet that is stored at the address indicated by the DMA source address (716). In one implementation, encryption/decryption engine 402 uses DMA block transfers to retrieve portions of the packet from dual-port memory 203. As each block is encrypted/decrypted, the results are transferred back to the dual-port memory 203 (718). Again, DMA block data transfers can be used to write blocks of data back to dual-port memory 203 starting at the address indicated by the DMA destination register. The encryption/decryption engine also writes a busy signal into a DES status register to indicate to the system that the encryption/decryption engine is operating on a packet.

When encryption/decryption engine 402 completes a job (720), the engine indicates the success or failure by writing a bit in DES status register (722). In one implementation, the DES status register includes a DES done bit, for indicating that the engine has finished encryption or decryption; and a DES error bit, indicating that an error has occurred in the encryption/decryption process.

CPU 134 polls the DES status register to check if the encryption/decryption engine has completed the job. When the DES status register indicates the job is complete, CPU 134 can access the results starting at the address indicated by the DMA destination address register. At this point, the encrypted/decrypted data is available for further processing by CPU 134, which in turn builds a new packet for transfer through a network interface (726). Thereafter the process ends (728).

Figure 8:
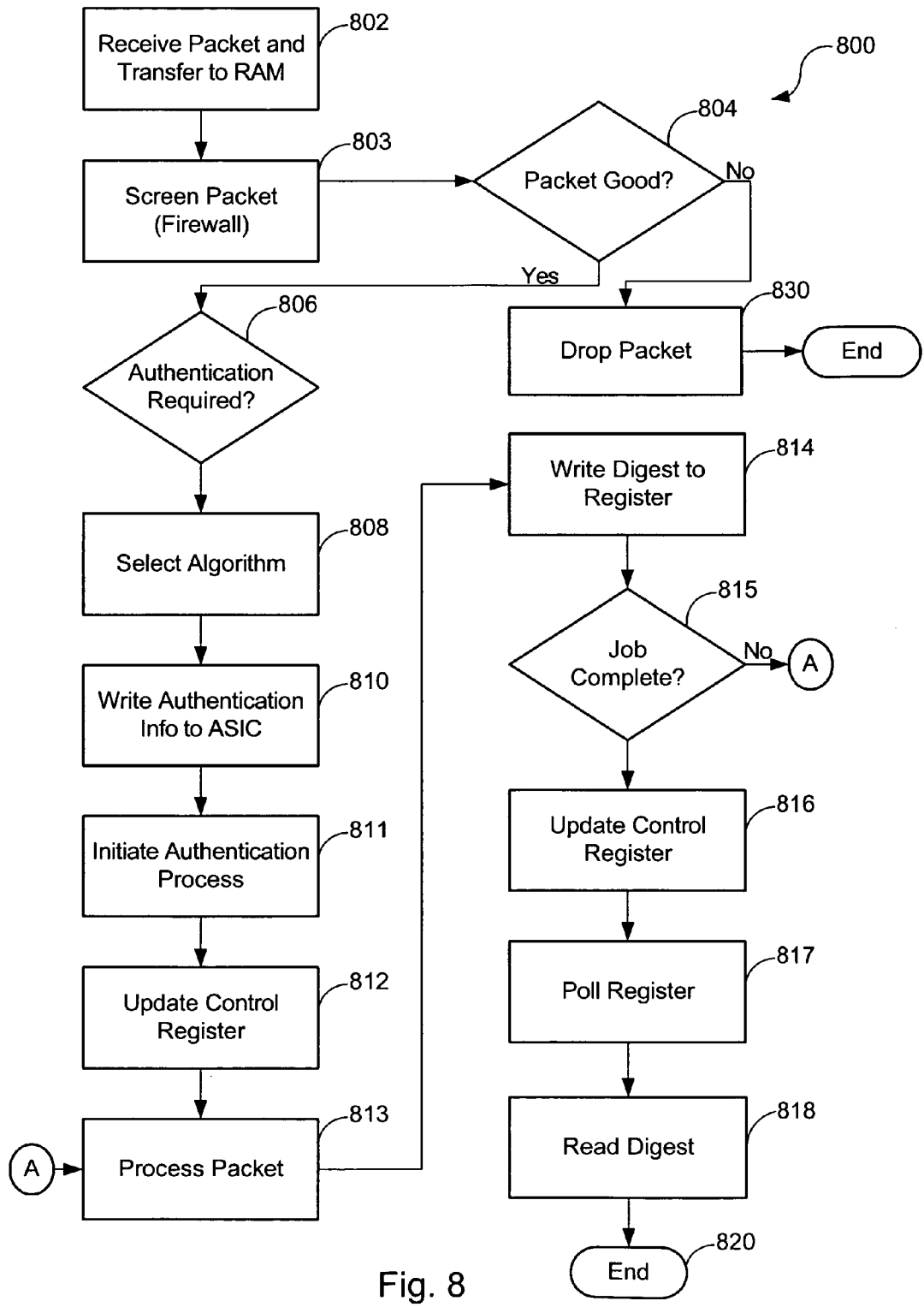
FIG. 8 is a flow diagram for an authentication process.

Referring now to FIGS. 2, 4 and 8, a process 800 for authenticating packets is shown. The process begins after a packet is received at a network interface and DMA'ed to dual-port memory 203 (802). If the packet is permitted (804) after the firewall inspection (803) and authentication is needed (806), the following operations are performed. Else the packet is dropped and the process ends (830).

An authentication algorithm is selected (808). In one implementation, two authentication algorithms (MD5 and SHA1) are included in authentication engine 404. Both the MD5 and SHA1 algorithms operate in a similar manner and can share some registers on ASIC 204. Only one is required for authentication of a packet. As an example, a MD5 authentication process is described below. The SHA1 process is similar for the purposes of this disclosure.

CPU 134 writes related information into MD5 related registers on ASIC 204 (810). In one implementation, ASIC 204 includes a plurality of MD5 registers for supporting the authentication process including: MD5 state registers, for storing the initial values used by the MD5 authentication algorithm; a packet base register, for storing the starting address of the message to be processed; a packet length register, for storing the length of the message to be processed; a MD5 control register, for signaling the availability of a packet for processing; and a MD5 status register.

CPU 134 issues a command to start the MD5 process (811) by writing to the MD5 control register (812). The authentication engine 404 begins the process by writing a busy signal to the MD5 status register to let CPU 134 know the authentication engine is processing a request (authenticating a packet). Authentication engine 404 processes the packet (813) and places the digest result into the MD5 state registers (814). When the job is complete (815), authentication engine 404 signals the completion by setting one or more bits in the MD5 status register (816). In one implementation, two bits are used: a MD5 done bit, indicating authentication engine 404 has finished the authentication process; and a MD5 error bit, indicating that an error occurred. CPU 134 polls the MD5 status register to determine if the authentication job is complete (817). When the MD5 done bit is set, CPU 134 reads out the digest results from the MD5 state registers (818). Thereafter, the process ends (830).

In one implementation, parallel processing can be performed in ASIC 204. For example, the MD5 or SHA1 authentication process can be intervened with the encryption/decryption process. When receiving a packet, ASIC 204 initiates an encryption (DES or Triple-DES) process on a packet. After a couple clock cycles, ASIC 204 can start the authentication process (MD5 or SHA1) without interrupting the encryption process. The two processes proceed in the same time period and finish in almost the same time. This can reduce the overall process time in half.

More specifically, after a packet is transferred into the dual-port memory 203, it can be fetched by ASIC 204 using local bus 202. The encryption/decryption engine 402 can be invoked, and after several clock cycles, authentication, using authentication engine 404, can start for the same packet. The two engines work in an intervening manner without sacrificing each engine's performance. In one implementation, the other possible combinations for parallel processing include: DES Encryption+MD5 authentication, MD5 authentication+DES decryption, Triple DES Encryption+ MD5 authentication, MD5 authentication+Triple DES decryption, DES Encryption+SHA1 authentication, SHA1 authentication+DES decryption, Triple DES Encryption+ SHA1 authentication and SHA1 authentication+Triple DES Decryption.

Packet flow through each engine can be in blocks or on a word by word basis. In one implementation, the packet data is grouped in a block and transferred in blocks using the local bus and memory bus.

The present invention has been described in terms of specific embodiments, which are illustrative of the invention and not to be construed as limiting. Other embodiments are within the scope of the following claims.

What is claimed is:

1. A network device comprising:
   an interface to receive a plurality of packets from a network;
   a first memory to store the packets;
   a controller to coordinate transfer of the packets to and from the memory;
   a packet processor to perform a plurality of processing operations on the packets that are retrieved from the memory, wherein the packet processor includes a second memory to store a first portion of a control policy; and
   a third memory to store a second portion of the control policy, wherein the packet processor is configured to:
   apply the first portion of the control policy to at least one of the retrieved packets,
   search the third memory for the second portion of the control policy, and
   apply, following the search, the second portion of the control policy to the at least one retrieved packet.

2. The network device of claim 1, wherein the first portion of the control policy includes a pointer to the second portion of the control policy.

3. The network device of claim 1, wherein the packet processor further includes at least two of a direct memory access engine, a firewall engine, an encryption/decryption engine, or an authentication engine.

4. The network device of claim 3, wherein the at least two engines are configured to operate in parallel with respect to the second packet.

5. The network device of claim 4, wherein the parallel operations do not degrade a performance of either of the at least two engines.

6. The network device of claim 1, wherein the plurality of processing operations include at least two of authentication, encryption, decryption, virtual private network (VPN), or firewall services.

7. The network device of claim 6, wherein the at least two operations are performed in parallel with respect to the second packet.

8. The network device of claim 1, wherein the plurality of processing operations include at least two of data encryption standard (DES) encryption, message digest 5 (MD5) authentication, triple DES encryption, or secure hash algorithm (SHA1) authentication.

9. The network device of claim 8, wherein the at least two processing operations are performed in parallel with respect to the second packet without causing interruption to either of the at least two processing operations.

10. The network device of claim 8, wherein the packet processor is further configured to initiate a first of the at least two processing operations within a plurality of clock cycles following an initiation and without interruption of a second of the at least two packet processing operations.

11. A method comprising:
receiving, at a network device, a plurality of packets from a first network which are destined for a second network;
transferring, via a first bus, a first one of the received packets for storage within the network device;
retrieving, via a second bus, the first packet from storage; and
performing a plurality of security-related packet processing operations on the retrieved packet, and concurrently transferring, via the first bus, a second one of the received packets for storage within the network device.

12. The method of claim 11, wherein the plurality of security-related packet processing operations comprise at least two of authentication, encryption, decryption, virtual private network (VPN), or firewall services.

13. The method of claim 12, wherein the at least two security-related packet processing operations are performed in parallel.

14. The method of claim 12, wherein a first of the at least two security-related packet processing operations is initiated within a plurality of clock cycles following an initiation and without interruption of a second of the at least two security-related packet processing operations.

15. The method of claim 11, wherein the plurality of security-related packet processing operations comprise at least two of data encryption standard (DES) encryption, message digest 5 (MD5) authentication, triple DES encryption, or secure hash algorithm (SHA1) authentication.

16. The method of claim 15, wherein the at least two security-related packet processing operations are performed in parallel.

17. A communication system comprising:
means for receiving a plurality of packets from a network;
means for storing the packets;
means for coordinating transfer of the packets to and from storage;
means for performing a plurality of security-related processing operations on the packets that are retrieved from storage;
means for conveying a first one of the packets between the means for coordinating transfer and storage; and
means for conveying a second one of the packets between storage and the means for performing security-related processing, wherein the first and second packets are conveyed concurrently.

18. The communication system of claim 17, wherein the means for performing the plurality of security-related processing operations comprises:
means for achieving direct storage access,
means for screening the packets that are retrieved from storage,
means for encrypting or decrypting the packets that are retrieved from storage, and
means for authenticating the packets that are retrieved from storage.

19. The communication system of claim 18, wherein the means for encrypting or decrypting the packets and the means for authenticating the packets are configured to operate in parallel with respect to the second packet.

20. The communication system of claim 18, wherein the means for encrypting or decrypting the packets comprises:
means for performing at least one of data encryption standard (DES) encryption, or triple DES encryption.

* * * * *